(12) United States Patent
Robinault et al.

(10) Patent No.: US 11,598,458 B2
(45) Date of Patent: Mar. 7, 2023

(54) HINGED CONNECTION DEVICE OF TWO TUBULAR COMPONENTS

(71) Applicant: AKWEL VANNES FRANCE, Vannes (FR)

(72) Inventors: Michel Robinault, Sene (FR); David Gateau, Locmaria Grand Champ (FR); Hervé Simon, Saint Ave (FR); Pascal Guerry, Seppois-le-Haut (FR)

(73) Assignee: AKWEL VANNES FRANCE, Vannes (FR)

( * ) Notice: Subject to any disclaimer, the term of this patent is extended or adjusted under 35 U.S.C. 154(b) by 322 days.

(21) Appl. No.: 16/795,807

(22) Filed: Feb. 20, 2020

(65) Prior Publication Data

US 2020/0263817 A1   Aug. 20, 2020

(30) Foreign Application Priority Data

Feb. 20, 2019 (FR) ...................................... 19/01697

(51) Int. Cl.
*F16L 27/06* (2006.01)

(52) U.S. Cl.
CPC .................................... *F16L 27/06* (2013.01)

(58) Field of Classification Search
CPC ......... F16L 27/04; F16L 27/06; F16L 27/073; F16L 27/02; F16L 27/026; F16L 27/125; F16L 37/50; F16L 37/52
USPC ........................................ 285/261, 263, 270
See application file for complete search history.

(56) References Cited

U.S. PATENT DOCUMENTS

| 1,434,631 | A |   | 11/1922 | Reynolds |           |
|-----------|---|---|---------|----------|-----------|
| 2,456,744 | A | * | 12/1948 | Sjoberg  | F16L 37/52 |
|           |   |   |         |          | 285/261   |
| 3,165,339 | A |   | 1/1965  | Faccon   |           |
| 3,995,889 | A |   | 12/1976 | Carr et al. |        |
| 4,641,861 | A |   | 2/1987  | Scoboria |           |
| 4,815,771 | A | * | 3/1989  | Paspati  | F16L 37/52 |
|           |   |   |         |          | 285/263   |
| 5,129,681 | A | * | 7/1992  | Yano     | F16L 27/04 |
|           |   |   |         |          | 285/270   |
| 5,160,176 | A | * | 11/1992 | Gale     | F16L 27/026 |
|           |   |   |         |          | 285/261   |

(Continued)

FOREIGN PATENT DOCUMENTS

| AU | 2009213048 A1 | 3/2011 |
| CN | 1226958 A | 8/1999 |

(Continued)

*Primary Examiner* — Zachary T Dragicevich
*Assistant Examiner* — William S. Choi
(74) *Attorney, Agent, or Firm* — Oliff PLC

(57) ABSTRACT

A hinged connection device includes first and second tubular components around a main axis which respectively include a first male hinge member provided with an end head shaped as a spherical segment and a second female hinge member provided with a complementary seat receiving movably inside the end head of the first member. The first member is configured to be housed at least partially inside the first component and to be assembled to the second component throughout the second member. The second member is configured to be mounted around the second component and assembled to the first component over the first member such that the two tubular components are assembled together by the reciprocal intersection of the two hinge members.

11 Claims, 6 Drawing Sheets

(56) References Cited

U.S. PATENT DOCUMENTS

| | | | |
|---|---|---|---|
| 5,286,071 A | 2/1994 | Storage | |
| 5,740,839 A * | 4/1998 | Kuo | F16L 27/026 |
| 5,897,146 A * | 4/1999 | Saito | F16L 27/125 |
| | | | 285/261 |
| 2009/0021006 A1 | 1/2009 | Hobbs | |

FOREIGN PATENT DOCUMENTS

| | | |
|---|---|---|
| CN | 106195484 A | 12/2016 |
| CN | 107532764 A | 1/2018 |
| CN | 207145824 U | 3/2018 |
| DE | 858 049 C | 12/1952 |
| FR | 2622671 A1 | 5/1989 |
| GB | 2 173 271 A | 10/1986 |
| KR | 20-2013-0001142 U | 2/2013 |

* cited by examiner

[Fig. 1]
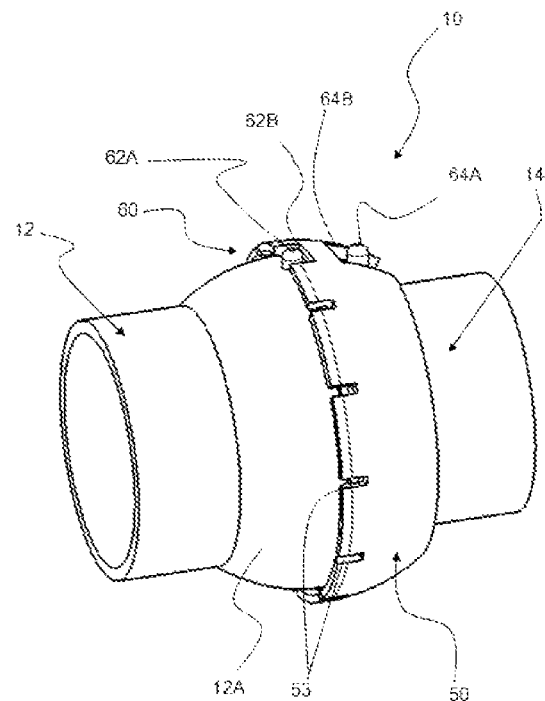
[Fig. 2]
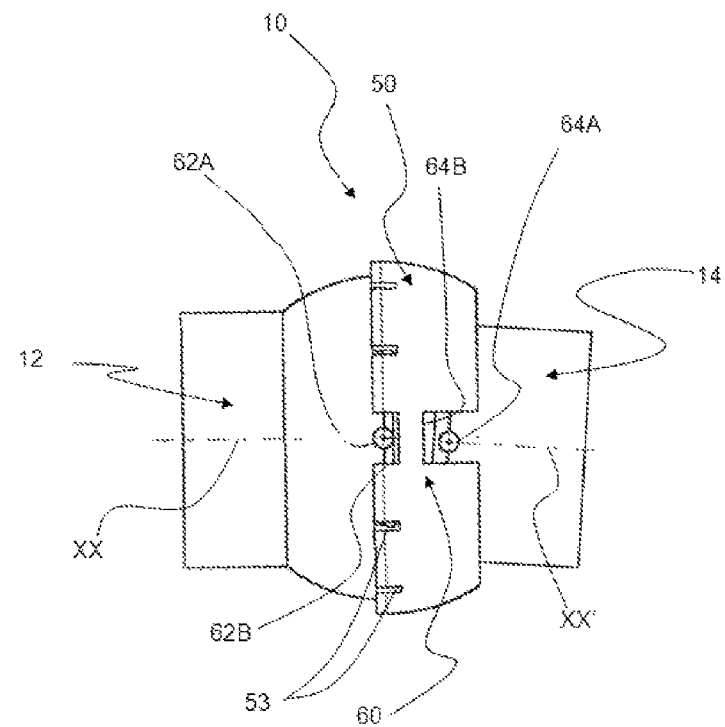

[Fig. 3]
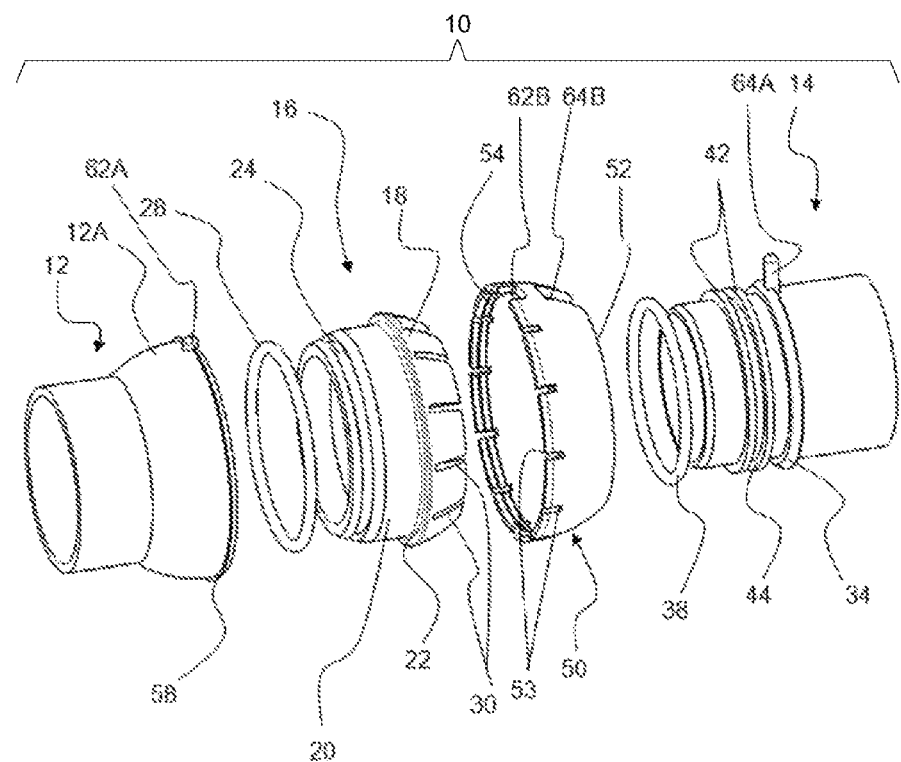
[Fig. 4]
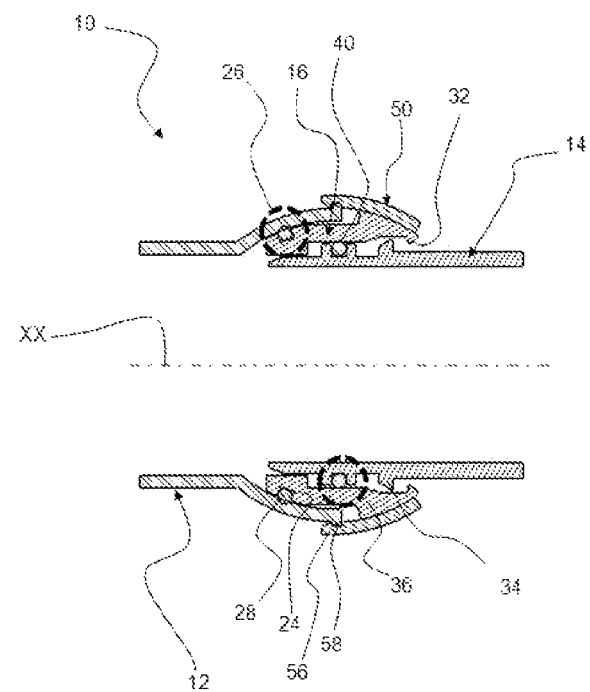

[Fig. 5]
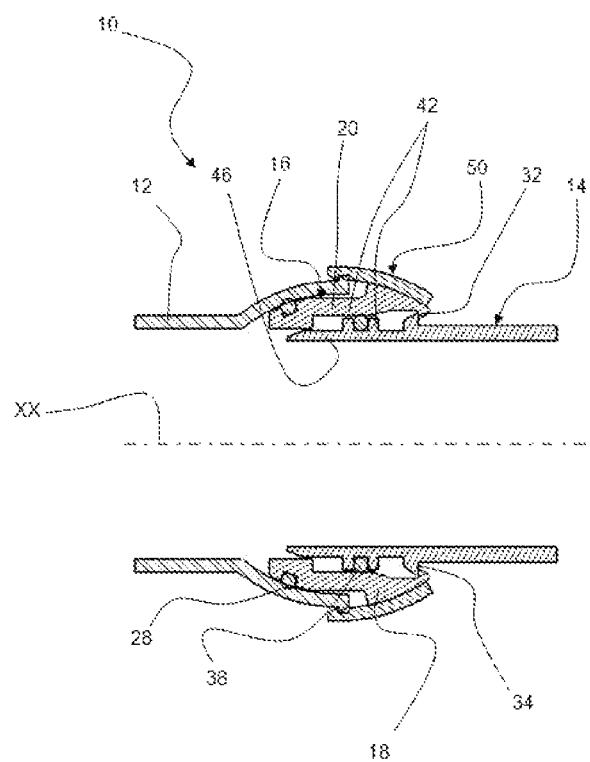
[Fig. 6]
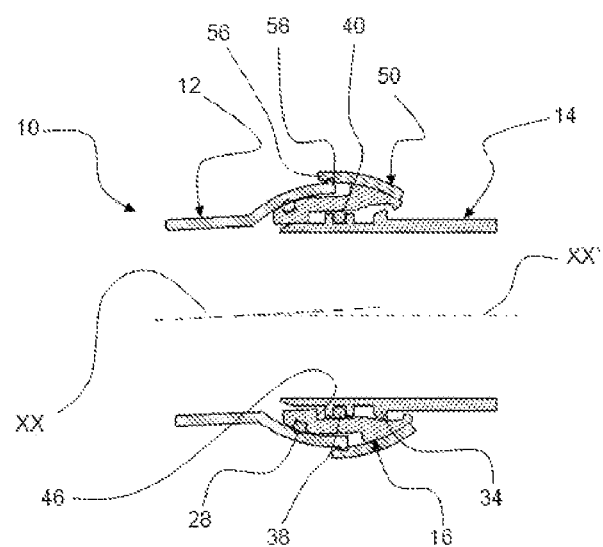

[Fig. 7]
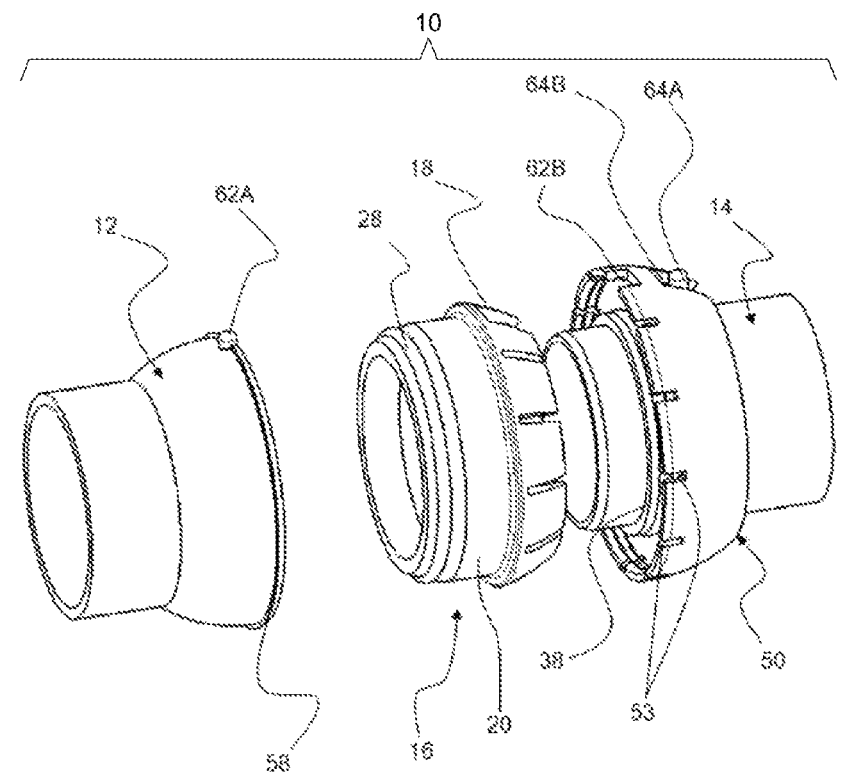
[Fig. 8]
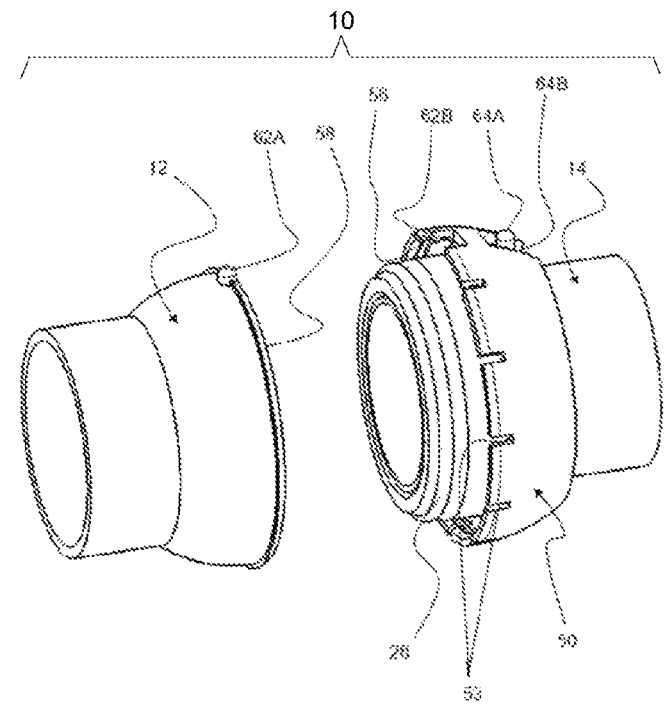

[Fig. 9]
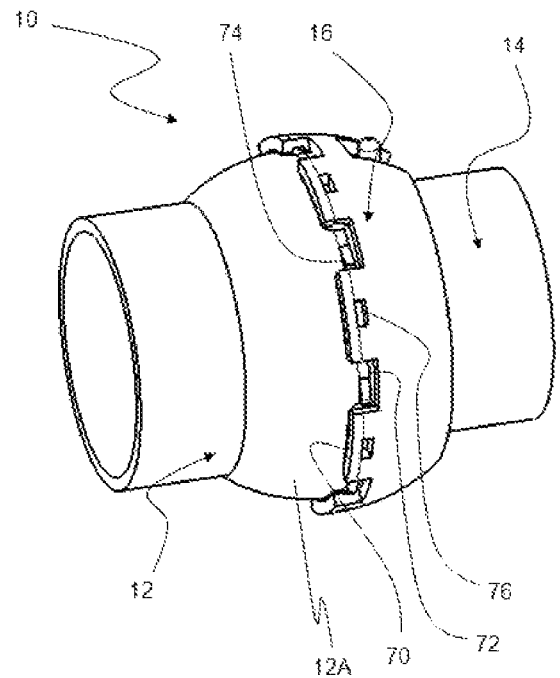
[Fig. 10]
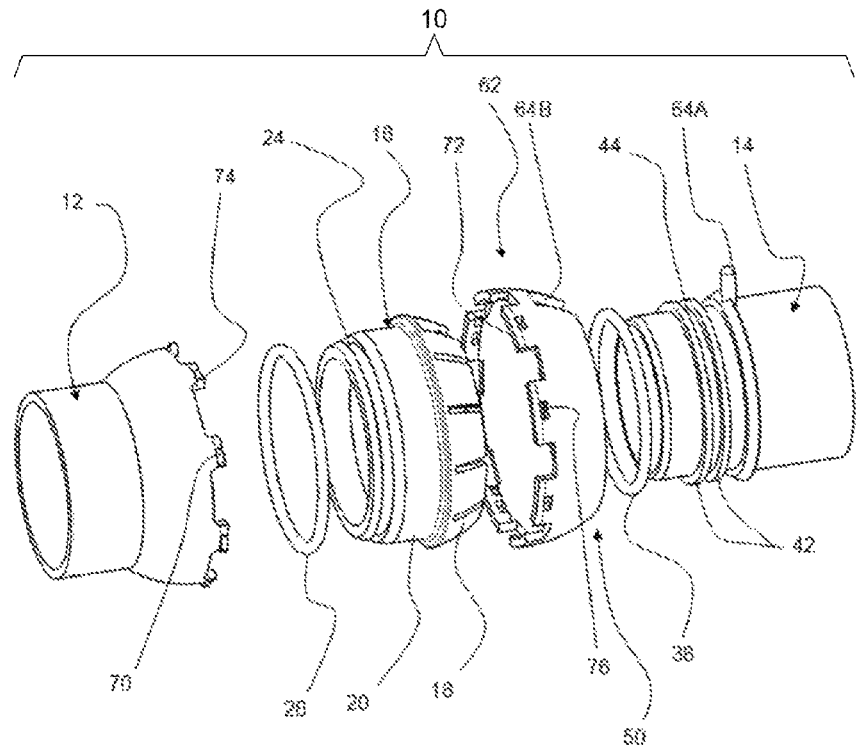

[Fig. 11]
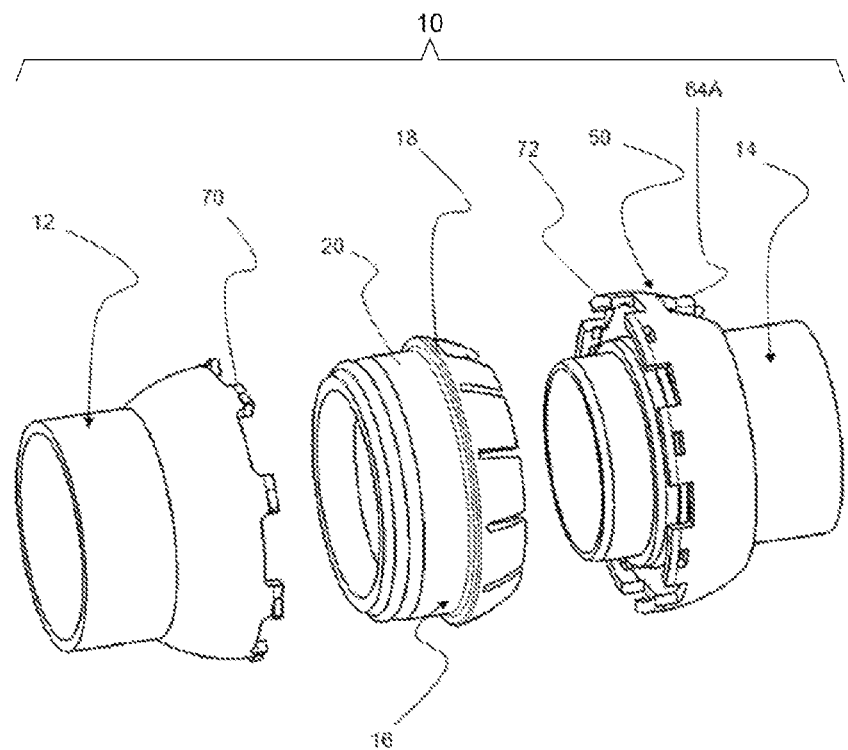
[Fig. 12]
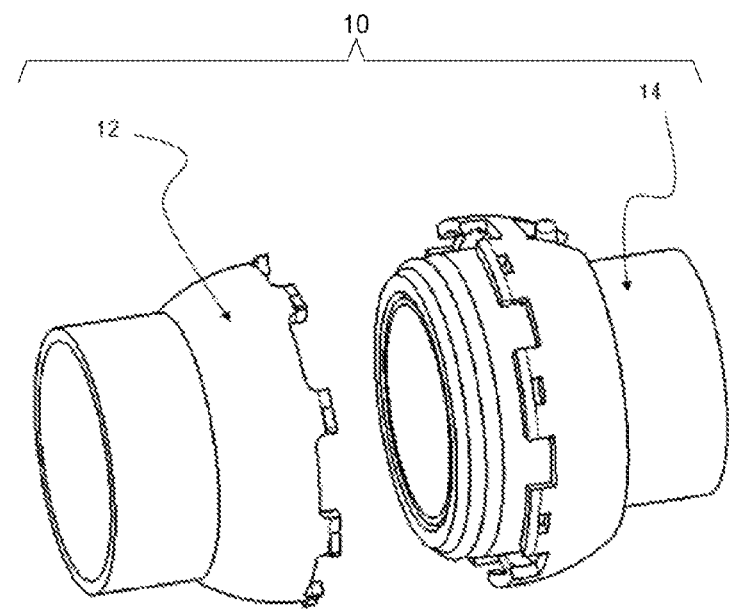

HINGED CONNECTION DEVICE OF TWO TUBULAR COMPONENTS

TECHNICAL FIELD

The present invention concerns a hinged connection device, in particular for connecting two tubular components, enabling linear, angular and rotary movements therebetween. It applies more particularly but not exclusively to the automotive technical field, for example, to hingedly interconnect an air intake duct at the outlet of a turbocharger and an exchanger, such as an air/air or air/liquid intercooler of an internal combustion engine.

In particular, such an air intake duct is conventionally made of a rigid or quasi-rigid plastic material, for example a thermoplastic material. The intake duct is not intended to make dynamic movements in operation, but is rather essentially fixed and, depending on the intended use, must at most perform small typical movements due to thermal expansion in operation for example or during the assembly to absorb the tolerances of relative positioning of the parts therebetween.

In order to absorb the assembly, mounting and expansion dispersions in operation, the air intake duct is for example made by assembling flexible components such as elastomeric tubes and sleeves and more rigid components such as thermoplastic tubings. These ducts are assembled on the different drive members while enabling some flexibility thus allowing taking up the dispersions.

Yet, these successive connections of flexible and rigid components present a risk of generating leakages and of causing stresses, additional deformations, under pressure, on the different fastening elements to which they might be connected.

There is thus a need for a hinged connection, in particular between two rigid tubular components, which allows taking up the clearances by absorbing the different tolerances between the components of the motorization on which this duct might be assembled (turbo, exchanger, throttle body, lugs for fastening on an alternator, etc.) as well as the tolerances for making the duct itself, in particular by linear and rotational, angular and axial movements.

Furthermore, such a hinged connection must support stresses inherent in the specificity of the air intake ducts, such as the resistances to pressures, temperatures, (air, oil vapor and fuel) tightness, movements, assembly and expansion tolerances of the engine in operation.

PRIOR ART

It is already known, in particular from the document KR20130001142U, a hinged connector for interconnecting first and second metal connection tubes. In order to achieve a linear and rotary connection of the two tubes together, the connector also comprises a generally spherical member interposed between the two tubes cooperating with one of the tubes to make a ball joint and with the other of the tubes to make a linear connection. Furthermore, in order to hold the different parts together, the connector also includes a fastening ring which is held using a set of screws.

There is therefore a need for a hinged connection connector which allows connecting two tubular components together while enabling linear and rotational movements, easy to assemble without requiring tools or additional welding or screwing operations.

SUMMARY OF THE INVENTION

To this end, the object of the invention is a hinged connection device, of the type comprising first and second tubular components around a main axis, the first and second components comprising respectively a separable first male hinge member provided with an end head shaped as a spherical segment and a separable second female hinge member provided with a complementary seat receiving movably inside the end head of the first member, characterized in that the first member is configured to be housed at least partially inside the first component and to be assembled to the second component throughout the second member, in that the second member is configured to be mounted around the second component and assembled to the first component over the first member such that the two tubular components are linked to each other by the reciprocal intersection of the two hinge members and in that the end head is provided with an elastic radial expansion portion for its assembly around the second component and the second component comprises a downstream relief forming a bead or a collar for axially retaining the end head.

Thanks to the invention, the reciprocal intersection of the two hinge members to each other allows achieving a reliable assembly without requiring complex operations but only for example simple mechanical operations such as snap-fitting operations.

As is easily understood, the device in accordance with the invention has a number of advantages. Its mounting and disassembly are performed without any tool, since it includes neither a threaded rod nor a nut for the assembly, but only male and female members prone to be engaged into each other and to be released by a tensile effort sufficient to overcome the assembly force. In addition, as the members have surfaces in spherical contact, this connection device enables considerable angular displacements.

By convention, in the present application, the terms «upstream» and «downstream» are defined with respect to the direction of circulation of the fluid in the illustrated example of the device, namely in the direction from the first component towards the second component according to the main axis. Similarly, by convention in the present application, the terms «internal» and «external», «lower» and «upper», and «inner» and «outer» are defined radially with respect to the main axis. Thus, a tubular component extends according to the main axis includes an internal face facing the main axis and an external surface, opposite to its internal surface.

A hinged connection device according to the invention may include one or more of the following features listed hereinafter.

In a preferred embodiment, the device comprises means for angular indexing of the two tubular components according to a circumferential direction configured to relatively orient and/or immobilize in rotation the two components.

In another preferred embodiment, the end head is provided with an elastic radial expansion portion for its assembly around the second component and the second component comprises a downstream relief forming a bead or a collar for axially retaining the end head.

In another preferred embodiment, the second member comprises an elastic radial expansion portion for its assembly on the first component and the first component comprises an outer radially protruding flange for axially retaining the second member.

In another preferred embodiment, the first member is configured to be displaced axially along the second component within a predefined stroke between upstream and downstream extreme positions.

In another preferred embodiment, the first member comprises an inner wall provided with a radial shoulder configured to abut against a first upstream relief formed on the second component.

In another preferred embodiment, the second component comprises a second downstream relief for axially retaining the first male member.

In another preferred embodiment, the second member includes an annular body generally shaped as a spherical segment.

In another preferred embodiment, the first component is provided with a flared end shaped as a spherical segment configured to extend, in the mounted state, substantially in the axial extension of the spherical segment of the second member.

In another preferred embodiment, the first male member and the first component comprise a mutual configuration capable of achieving a first upstream sealing connection of the device.

In another preferred embodiment, the first male member and the second component comprise a mutual configuration capable of achieving a second downstream sealing connection of the device.

In another preferred embodiment, each of the first component and the second female member comprises an end edge circumferentially delimiting protruding and recessed complementary nesting elements configured so that the end edges could mutually fit into each other and be assembled by a rotary locking action by a predefined fraction of a revolution.

BRIEF DESCRIPTION OF THE DRAWINGS

Other features and advantages of the invention will appear in light of the following description, made with reference to the appended drawings in which:

FIG. 1 represents a perspective view of a hinged connection device according to a first embodiment in an assembled configuration;

FIG. 2 represents a perspective view of the device of FIG. 1 in an inclined position;

FIG. 3 represents a perspective view of the device of FIG. 1 in an exploded configuration;

FIG. 4 represents an axial sectional view of the device of FIG. 1 in a first position;

FIG. 5 represents an axial sectional view of the device of FIG. 1 in a second translated position;

FIG. 6 represents an axial sectional view of the device of FIG. 1 in a third inclined position;

FIG. 7 represents a first step of mounting the device of FIG. 1;

FIG. 8 represents a second step of mounting the device of FIG. 1;

FIG. 9 represents a perspective view of a connection device according to a second embodiment in a mounted configuration;

FIG. 10 represents a perspective view of the device of FIG. 9 in an exploded configuration;

FIG. 11 illustrates a first step of mounting the device of FIG. 9;

FIG. 12 illustrates a second step of mounting the device of FIG. 9.

DESCRIPTION OF THE EMBODIMENTS

A hinged connection device is represented in particular in FIG. 1 according to a first embodiment of the invention. The device is designated by the general reference numeral 10. This first embodiment will be described in detail with reference to FIGS. 1 to 8.

As it appears clearly in FIGS. 1 and 2, the device 10 comprises a first tubular component 12 and a second tubular component 14 hingedly connected to each other about a main axis XX. In the illustrated example, the first tubular component 12 is for example an air intake duct element (not represented) and the second tubular component 14 is a second portion of the air intake duct.

By convention, in the present application, the terms «upstream» and «downstream» are defined with respect to the direction of circulation of the fluid in the illustrated example of the device 10, namely in the direction from the first component 12 towards the second component 14 according to the main axis XX. Similarly, by convention in the present application, the terms «internal» and «external», «lower» and «upper», and «inner» and «outer» are defined radially with respect to the main axis XX. Thus, a tubular component extending according to the main axis XX includes an internal face facing the main axis XX and an external surface, opposite to its internal surface.

As illustrated in FIG. 3, the first component 12 is associated to a first male hinge member 16 provided with an end head 18 shaped as a spherical segment.

In the illustrated example, the first male member 16 comprises a stepped tubular shaped body comprising a downstream tubular portion forming the end head 18 and an upstream tubular portion 20 shaped as a cylindrical end-piece, with a smaller diameter. The two portions 18 and 20 are for example axially delimited by an annular transverse wall 22 forming an external shoulder.

Preferably, the male member 16 is configured to be inserted axially inside the first component 12. To this end, the first component 12 includes a main body with a cylindrical tubular general shape provided with a free end portion 12A shaped so as to receive the cylindrical end-piece 20 of the male member 16. As illustrated in FIG. 3, the first component 12 includes a flared end portion 12A generally shaped as a sphere segment. This flared end portion 12A delimits a semi-spherical inner cavity inside which the cylindrical end-piece 20 can be received.

Preferably, the first component 12 and the male member 16 comprise a mutual configuration capable of making a first sealing connection 26 schematically located in FIG. 4 by a circle in dotted lines. For example, the first component 12 and the male member 16 delimit in the assembled state a peripheral recess 24 for receiving a first sealing gasket 28 to form the first sealing connection 26. This allows making a sealed assembly by radial clamping of said sealing gasket 28.

This first sealing mechanical connection 26 between the first component 12 and the male member 16 essentially results from bearing forces exerted between these two parts via the first sealing gasket 28. The sealing gasket 28 creates, for example, an overthickness extending slightly outwardly of the groove 24 and is thus compressed therein during the mounting of the first component 12 and the male member 16.

This sealing gasket 28 is for example an elastomer O-ring gasket which is flattened (compressed) between two cylindrical bearing faces provided respectively on each of the two parts. Preferably, in the absence of the O-ring gasket 28, the male member 16 can freely slide inside the receiving cavity 12A of the first component 12: in the presence of the sealing gasket 28, the male member 16 can slide in the cavity 12A only by the action of a sufficient effort. In a variant of the invention, the annular sealing gasket 28 may be of the lip or quadralobal-shaped section type.

In the example illustrated in FIG. 3, the cylindrical end-piece 20 of the male member 16 intended to be fitted inside the end portion 12A of the first component 12 includes on its outer wall a circumferential groove 24 for receiving the sealing gasket 28. Moreover, preferably, the inner wall of the cylindrical end-piece 20 has at the end a slight chamfer, thus facilitating its insertion inside the first component 12. Moreover, the groove 24 is formed, as shown in FIGS. 4 to 6, in this chamfered end portion of the cylindrical end-piece 20.

Furthermore, in accordance with the invention, the male member 16 is also assembled to the second component 14. To this end, preferably, the end head 18 is provided with an end portion with elastic radial expansion for its assembly around the second component 14. For example, the head 18 is slit at the end and is for example provided in this portion with axial openings 30 or slots enabling the radial elastic expansion to enable an elastic deformation allowing its fitting around the second component 14.

Preferably, the end head 18 is further provided with an inner end flange 32 protruding radially inwardly, for example shaped as an annular hook. The second component 14 further comprises a relief 34, for example a circumferential relief, generally shaped as a snap-fitting bead or collar to ensure the axial retention of the male member 16 on the bead 34 after its elastic return.

When it is fitted around the second component 14, the male member 16 cooperates with the bead 34 by elastic deformation to enable the bead 34 to be crossed by bending the annular hook 32 and thus obtain a forced snap-fitting. In order to facilitate the snap-fitting operation, as shown in FIG. 4, the collar 34 and the hook 32 may be provided with chamfered surfaces such that the chamfers engage and cooperate with each other during the snap-fitting operation.

Of course, the assembly of the male member 16 and the second tubular component 14 may be made differently without departing from the scope of the invention.

Furthermore, preferably, the male member 16 and the second component 14 comprise a mutual configuration capable of making a second sealing connection 36 in the device 10 (FIG. 4). Thus, in the example, a second sealing gasket 38 is interposed between the male member 16 and the second component 14 to make the sealed connection 36 downstream of the device 10. In the example, this second sealed connection 36 aims at ensuring the sealing of the annular connection of the device 10, as will be described in more detail hereinafter.

As illustrated in FIGS. 4 to 6, in a configuration after assembly, a localized area 40 of the inner wall of the male member 16 is arranged so as to press against the sealing gasket 38 and compress it, for example during the snap-fitting elastic return, after crossing the relief 34, by the end head 18. Possibly, although this is not illustrated in the figures, the male member 16 may be provided in its localized area 40 with a slightly cambered annular span configured to compress by contact the sealing gasket 38.

To this end, for example, the second component 14 comprises on its outer wall a pair of circumferential ribs 42 radially protruding delimiting therebetween a circumferential groove 44 to receive the second sealing gasket 38. Preferably, the sealing gasket 38 is an elastomeric annular seal of the O-ring, lip or quadralobal-shaped section type.

The male member 16 is configured to be displaced axially within a predefined stroke limited, on the one hand, by the upstream relief 42 and, on the other hand, by the downstream relief 34 formed in this example by the snap-fitting bead 34 of the end head 18. Preferably, in order to adjust its axial insertion, the male member 16 includes on its inner wall an inner shoulder 46 configured to come into axial abutment against the outer relief 42 formed upstream on the outer wall of the second component 14.

In accordance with the invention and as illustrated in FIG. 3, the second tubular component 14 includes a second female hinge member 50. This second female hinge member 50 includes a complementary seat receiving movably inside the end head 18 of the first member 16.

This second female member 50 has, in the described example, a crown or ring like general shape and has a spherical portion segment shape having a larger diameter end 54 and a smaller diameter end 52 (FIG. 3). This second female member 50 is intended to be mounted around the second component 14, by axial insertion of the second component 14 throughout the orifice of the ring. Preferably, during the assembly, the smaller diameter end 52 faces the second component 14 and the larger diameter end 54 faces the first component 12.

The first male member 16 having a partially spherical profile and the second member 50 also having a partially spherical profile, the first member 16 has an external diameter substantially equal to the internal diameter of the female member 50, such that the male member 16 could be nested inside the female member 50 in order to form a ball joint. As is shown in particular in FIGS. 4 to 6 in axial section, the end head 18 has an external curvature complementary to the internal curvature of the female member 50.

While being mounted around the second component 14 in a free and separable manner, the female member 50 is also assembled to the first component 12. Preferably, the assembly is achieved by forcibly snap-fastening its larger diameter end edge 54 on a relief of the first component 12.

To this end, in the described example, the female member 50 is provided on the upstream side 54 with a radially protruding internal annular flange 56 forming a snap-fitting type annular hook, preferably extending circumferentially and the first component 12 is provided with a radially protruding outer flange 58 also configured to cooperate with the flange 56 of the female member 50 by crossing. Furthermore, the female member 50 comprises an elastic radial expansion portion to facilitate the forced snap-fitting. For example, the female member 50 comprises a plurality of axial slots 53 on its end edge 54. Alternatively, the protruding flange 56 may include a plurality of hooks, for example three, forming evenly distributed snap-fitting angular sectors.

In accordance with the invention, the female member 50 is connected to the first component 12 over the male member 16 such that the two tubular parts 12 and 14 are retained together by the mutual intersection of the male 16 and female 50 members. Furthermore, the male member 16 is configured to be connected to the second component 14 by passing throughout the female member 50.

In order to achieve an angular indexing of the two tubular components 12 and 14 therebetween as may prove useful in some arrangements of the tubular circuit, the device 10 preferably comprises means 60 for angular indexing of the two tubular components 12, 14 according to a circumferential direction configured to orient relatively in rotation the two components 12, 14 while preferably leaving a circumferential clearance enabling a relative rotation of the two components 12 and 14 according to the circumferential direction.

The indexing means 60 comprise for example a first pair 62 for relative indexing of the first component 12 and of the female member 50. This first pair 62 is for example composed of an indexing finger 62A and a notch 62B configured to cooperate with each other with a circumferential clearance. The finger 62A is for example formed by a radial lug, carried by the first component 12 in the vicinity of its peripheral end edge 58. The notch 62B is for example formed on the female member 50 on the side of its larger diameter end edge 54. During the mounting, the female member 50 is rotated so as to axially coincide the notch 62B and the lug 62A, which allows indexing the first component 12 and the female member 50.

Furthermore, the indexing means 60 comprise in this example a second pair 64 for relative indexing of the second component 14 and the female member 50. For example, the second pair 64 is composed of a lug 64A and of a notch 64B. The lug 64A is carried by the second component 14 and the notch 64B is formed in the female member 50. The lug 64A extends radially, for example from the snap-fitting relief 34 of the end head 18. The relative rotation of the second component 14 and the female member 50 to bring the notch 64B and the lug 64A into coincidence allows achieving an angular indexing of these two parts.

In FIGS. 9 to 12, a second embodiment of the hinged connection device is represented. In this second embodiment, the elements similar to those of the first illustrated embodiment bear identical reference numerals.

In this second embodiment, the angular indexing means 62 between the first component 12 and the female member 50 is made by crenellated complementary end edges 70 and 72 comprising a series of teeth and hollows. In the described example, the first component 12 comprises radially protruding locking crenellations 74 and the female member 50 comprises recesses 76 configured to receive the locking crenellations 74 inside. The locking crenellations 74 are for example distributed circumferentially on the teeth of the crenellated edge 70 of the first component 12 and the recesses 76 are distributed circumferentially on the teeth of the crenellated edge 72 of the female member 50. The crenellations 74 comprise for example a ramp shape extending in its longitudinal direction according to the circumferential direction of the first component 12 in order to facilitate the engagement of the two parts 12 and 50.

The relative immobilization in rotation of the first component 12 and of the female member 50 is achieved in two steps: on the one hand, a mutual engagement of the complementary end edges 72, 70 into each other by making the hollows of one of the crenellated edges coincide with the teeth of the other of the crenellated edges then, on the other hand, a rotary locking action by a fraction of a revolution to bring the locking crenellations 74 into coupling engagement inside the recesses 76.

Referring to FIGS. 1 to 8, the main operating aspects of a hinged connection device 10 will now be described according to the first embodiment.

Initially, the hinged connection device 10 is in the disassembled state represented in FIG. 3.

During a first step illustrated in FIG. 7, the first sealing gasket 28 is positioned on the first male member 16 at the location of the circumferential groove 24 passing through the end-piece 20. Similarly, the second sealing gasket 38 is positioned on the second component 14 at the location of the circumferential groove 44. Thereafter, the female member 50 is fitted around the second component 14 by its smaller diameter end edge 52. A relative rotation of the female member 50 and of the second component 14 allows making the lug 64A coincide with the notch 64B and thus achieving an angular indexing of these two parts together.

During a second step illustrated in FIG. 8, the male member 16 is fitted around the second component 14 until causing the hook 32 to bend and then crossing the circumferential radial protrusion 34 of the second component 14 by said hook. During this fitting, the annular area 40 presses and compresses the second sealing gasket 38 inside the circumferential groove 44.

Finally, during the last step, the first component 12 and the already pre-assembled assembly formed by the second component 14, the male member 16 and the female member 50, are assembled together. Thus, the indexing mark 62A of the first component 12 is pre-positioned opposite the notch 62B provided on the female member 50. The female member 50 is then elastically deformed radially so as to snap-fit over the end protruding flange 58 of the first component 12 provided to this end.

This snap-fitting intersection allows connecting the two tubular components 12 and 14 to each other while leaving a movement clearance enabling angular and linear movements according to the main axis XX. For example, with reference to FIGS. 2 and 6, the second component 14 can be slightly pivoted (axis XX'). Furthermore, the axial insertion of the male member 16 can be adjusted within a predefined axial stroke between an extreme position illustrated in FIG. 5 and an extreme position in which the member 16 abuts with its shoulder 46 against a relief of the second component 14.

Of course, the invention is not limited to the previously described embodiments. Other embodiments within the reach of those skilled in the art may also be considered without departing from the scope of the invention defined by the claims hereinafter.

The invention claimed is:

1. A hinged connection device comprising:
    a first tubular component and a second tubular component around a same main axis, the first tubular component and the second tubular component respectively including a separable first male hinge member provided with an end head shaped as a spherical segment and a separable second female hinge member provided with a complementary seat receiving the end head, the end head being movable inside the complementary seat, wherein:
    the first male hinge member is configured to be housed at least partially inside the first tubular component and to be assembled to the second tubular component throughout the second female hinge member,
    the second female hinge member is configured to be mounted around the second tubular component and assembled to the first tubular component over the first male hinge member such that the first tubular component and the second tubular component are assembled together by the reciprocal intersection of the first male hinge member and the second female hinge member,
    the end head is provided with an elastic radial expansion portion for assembly around the second tubular component, and
    a downstream relief formed in the second tubular component as a bead or a collar for axially retaining the end head.

2. The device according to claim 1, further comprising means for angular indexing the first tubular component and the second tubular component according to a circumferential direction configured to relatively orient and/or immobilize rotation of the first tubular component and the second tubular component.

3. The device according to claim 1, wherein the second female hinge member includes an elastic radial expansion portion for assembly on the first tubular component and the first tubular component includes an outer radially protruding flange for axially retaining the second female hinge member.

4. The device according to claim 1, wherein the first male hinge member is configured to be displaced axially along the second tubular component within a predefined stroke between upstream and downstream extreme positions.

5. The device according to claim 1, wherein the first male hinge member includes an inner wall provided with a radial shoulder configured to abut against a first upstream rib of an upstream relief formed on the second tubular component.

6. The device according to claim 5, wherein the second tubular component includes a second downstream rib of the upstream relief for axially retaining the first male hinge member.

7. The device according to claim 6, wherein the second female hinge member includes an annular body shaped as a spherical segment.

8. The device according to claim 7, wherein the first tubular component is provided with a flared end shaped as a spherical segment configured to extend, in the mounted state, substantially in the axial extension of the spherical segment of the second female hinge member.

9. The device according to claim 1, wherein the first male hinge member and the first tubular component include a mutual configuration capable of making a first upstream sealing connection of the device.

10. The device according to claim 9, wherein the first male hinge member and the second tubular component include a second mutual configuration capable of making a second downstream sealing connection of the device.

11. The device according to claim 1, wherein each of the first tubular component and the second female hinge member includes an end edge circumferentially delimiting protruding and recessed complementary nesting elements configured so that the end edges could mutually fit into each other and be assembled by a rotary locking action by a predefined fraction of a revolution.

\* \* \* \* \*